United States Patent
Cheng et al.

(10) Patent No.: US 12,341,290 B2
(45) Date of Patent: Jun. 24, 2025

(54) ACTIVE AUDIO AND VIDEO SIGNAL TRANSMISSION DEVICE

(71) Applicant: Elka International Ltd., New Taipei (TW)

(72) Inventors: Yi-Chieh Cheng, New Taipei (TW); Yen-Tung Chen, New Taipei (TW); Yu-Shuo Pan, New Taipei (TW)

(73) Assignee: Elka International Ltd., New Taipei (TW)

( * ) Notice: Subject to any disclaimer, the term of this patent is extended or adjusted under 35 U.S.C. 154(b) by 411 days.

(21) Appl. No.: 17/977,746

(22) Filed: Oct. 31, 2022

(65) Prior Publication Data
US 2024/0055798 A1 Feb. 15, 2024

(30) Foreign Application Priority Data
Aug. 12, 2022 (TW) .................................. 111208801

(51) Int. Cl.
*H01R 13/627* (2006.01)
(52) U.S. Cl.
CPC .................................. *H01R 13/627* (2013.01)
(58) Field of Classification Search
None
See application file for complete search history.

(56) References Cited

U.S. PATENT DOCUMENTS

| | | | |
|---|---|---|---|
| 2009/0203266 A1* | 8/2009 | Chuang | H01R 13/6666 439/701 |
| 2014/0119425 A1 | 5/2014 | Boccaccio et al. | |
| 2017/0010429 A1* | 1/2017 | Park | G02B 6/4416 |
| 2019/0222799 A1 | 7/2019 | Boccaccio | |
| 2023/0108213 A1* | 4/2023 | Drury | G06F 11/3447 714/2 |

OTHER PUBLICATIONS

European search report issued by European Patent Office on Jan. 24, 2024.

* cited by examiner

*Primary Examiner* — Tim T Vo
*Assistant Examiner* — Dayton Lewis-Taylor
(74) *Attorney, Agent, or Firm* — Chun-Ming Shih; HDLS IPR SERVICES

(57) ABSTRACT

This disclosure provides an active audio and video signal transmission device, which comprises a cable, a display-side connector, and a signal source connector. The cable comprises a first end and a second end. The display-side connector comprises a first shell, a first circuit board configured within the first shell, a first plug configured on the first circuit board and protruded from the first shell, a repeater configured on the first circuit board and electrically connected to the first plug and the first end of the cable, and a microprocessor. The microprocessor is configured on the first circuit board, electrically connected to the repeater, and used for controlling an operation of the repeater. The signal source connector is connected to the second end of the cable. In the disclosure, the repeater is only configured within the display-side connector, and is not configured within the signal source connector.

20 Claims, 6 Drawing Sheets

ACTIVE AUDIO AND VIDEO SIGNAL TRANSMISSION DEVICE

This non-provisional application claims priority claim under 35 U.S.C. § 119(a) on Taiwan Patent Application No. 111208801 filed Aug. 12, 2022, the entire contents of which are incorporated herein by reference.

FIELD OF THE INVENTION

This disclosure relates to an active audio and video signal transmission device, particularly to an audio and video signal transmission device including a display-side connector with a repeater.

BACKGROUND

In a passive audio and video signal transmission device of HDMI 2.1 specification currently, the data transmission rate can be increased to 48 Gbps. However, a transmission distance of cable of the passive audio and video signal transmission device is usually limited, for example, if the passive audio and video signal transmission device for high-frequency applications is used in high-speed transmission, the length of cable of which is often only about 3 meters. Therefore, the passive audio and video signal transmission device is usually unable to be used in an application field for longer signal transmission without using a longer cable.

In the application field for longer signal transmission requiring a long cable, for achieving an effect of longer signal transmission and reducing signal distortion, an independent HDMI signal repeater is often adopted to be electrically connected between connectors of two HDMI cables. However, the independent HDMI signal repeater needs to be used with the two HDMI cables, which often causes inconvenience in use.

Besides, under adopting the same cable length and keeping no signal distortion, the cable of the passive video and audio signal transmission device can only select high-speed signal transmission core wires with a larger cross-sectional area, such that the number of core wires and signal types of the HDMI cable will be limited. Furthermore, since a chip with the function of the independent signal repeater consumes power very much, reducing the power consumption of the chip is also the focus of research under the condition of extending the length of cable and keeping no signal distortion.

SUMMARY

In order to solve the problems existing in the prior art, the present disclosure provides an active video and audio signal transmission device, which comprises a cable, a display-side connector, and a signal source connector. The cable comprises a first end and a second end. The display-side connector comprises a first shell, a first circuit board configured within the first shell, a first plug configured on the first circuit board, and protruded from the first shell, a repeater configured on the first circuit board, and electrically connected to the first plug and the first end of the cable, and a microprocessor. The microprocessor is configured on the first circuit board, electrically connected to the repeater, and used for controlling an operation of the repeater. The signal source connector is connected to the second end of the cable.

In the disclosure, the repeater is only configured within the display-side connector, and is not configured within the signal source connector.

In one embodiment of the discourse, the display-side connector and the signal source connector are connectors conforming to HDMI 2.1 standard specification.

In one embodiment of the discourse, the display-side connector further comprises a power management chip, the power management chip is configured on the first circuit board, connected to the first end of the cable for obtaining a power supply from the cable, and used for converting the power supply to a working voltage, and transmitting the working voltage to the microprocessor.

In one embodiment of the discourse, the cable comprises a plurality of signal transmitting wires that are electrically connected to the repeater via a first core wire welding area of the first circuit board of the display-side connector.

In one embodiment of the discourse, the cable comprises a power wire that is electrically connected to the power management chip via the first core wire welding area to provide the power supply to the power management chip.

In one embodiment of the discourse, the first plug of the display-side connector comprises a grounding shell and a signal transmission portion, and the cable further comprises a grounding wire; the grounding wire at the first end is electrically connected to the grounding shell, and the grounding shell surrounds the signal transmission portion; the signal transmission portion is electrically connected to the plurality of signal transmitting wires via the repeater.

In one embodiment of the discourse, the signal source connector further comprises a second shell, a second circuit board, and a second plug, the second circuit board is configured within the second shell, the second end of the cable is connected to the second plug via the second circuit board.

In one embodiment of the discourse, the cable comprises at least one high-speed transmission core wire, a range of cross-sectional area of the at least one high-speed transmission core wire is from 0.02 square millimeters to 0.3 square millimeters.

In one embodiment of the discourse, a length range of the cable is from 3 meters to 15 meters.

Through configured a repeater in the display-side connector of the audio and video signal transmission device of the discourse, the audio and video signal transmission device of the discourse can conform the HDMI 2.1 standard specification during the signal transmission. That is, the insertion loss of signal of the audio and video signal transmission device of the discourse can meet the requirements of HDMI 2.1 standard specification in the commonly operating-frequencies under the premise of reaching the data transmission rate of 48 Gbps and supporting enhanced audio return channel.

DETAILED DESCRIPTION OF THE PREFERRED EMBODIMENTS

Figure 1:
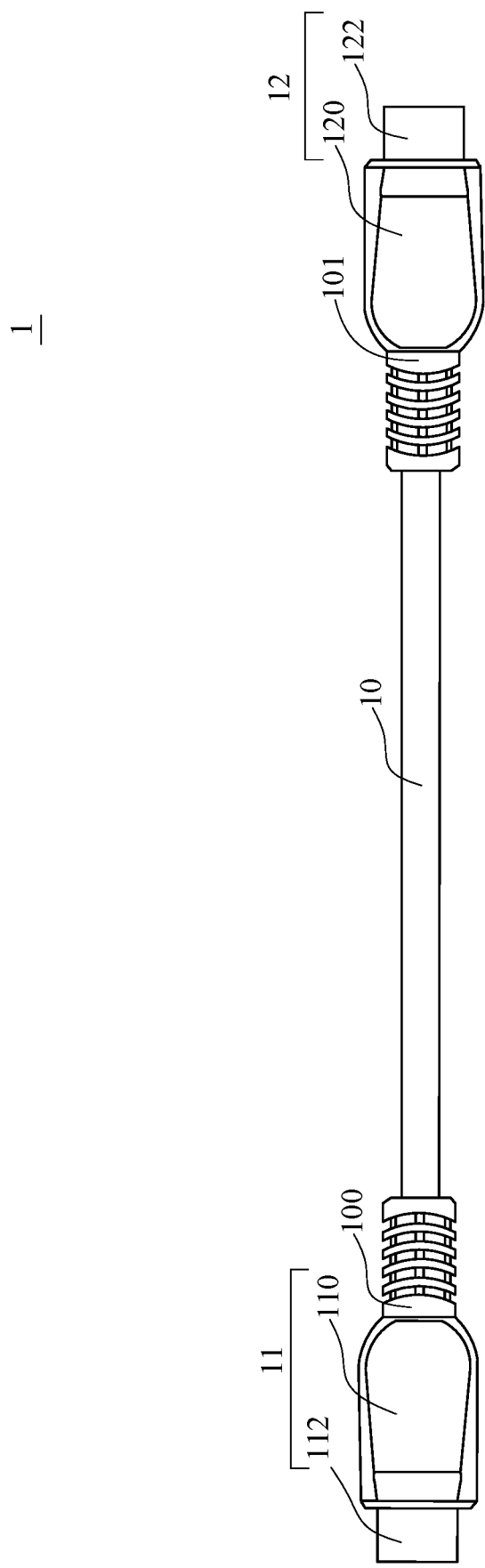
FIG. 1 is a structural plan view of an active audio and video signal transmission device of the disclosure.
Figure 2:
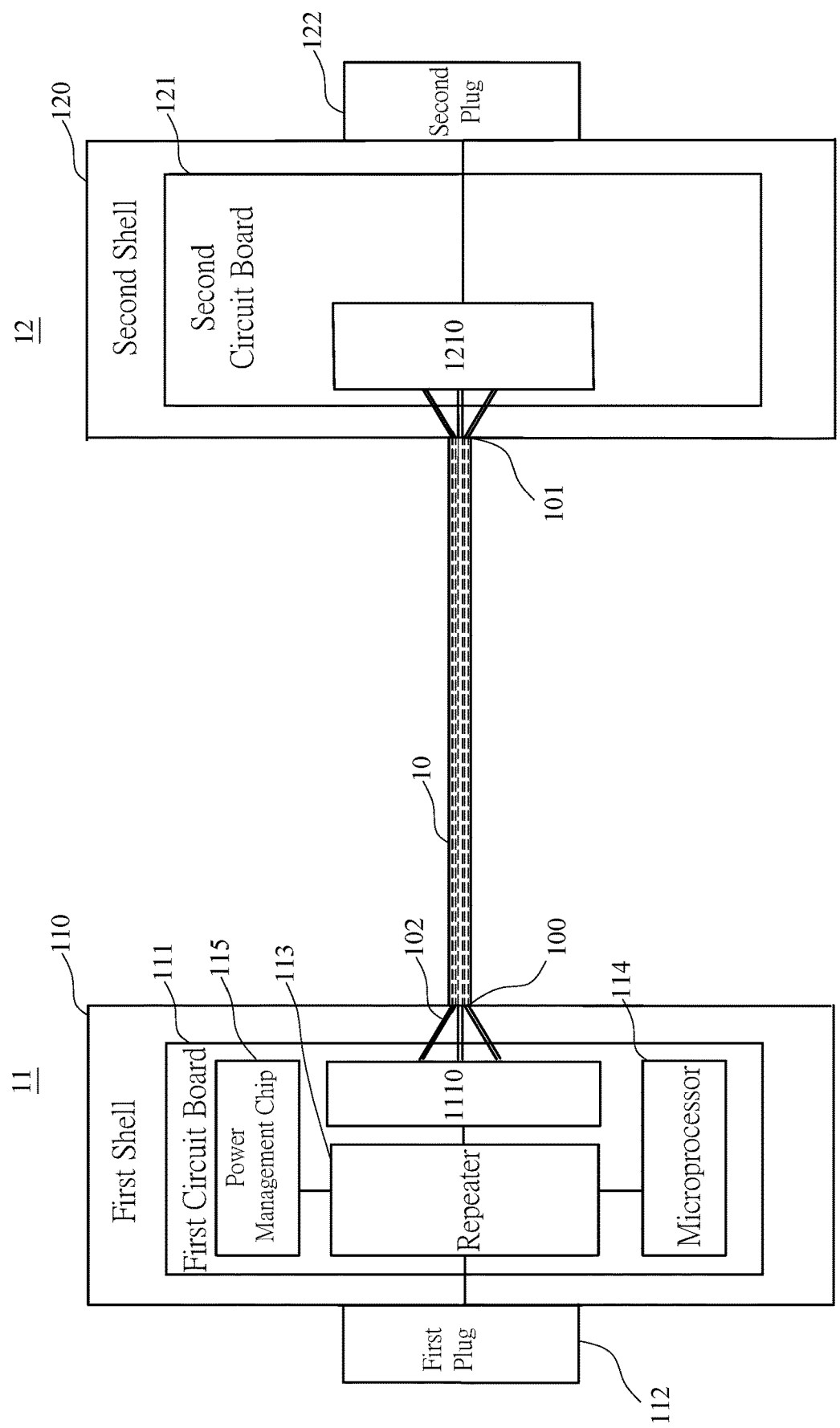
FIG. 2 is a circuit block view of the active audio and video signal transmission device of the disclosure.

Referring to FIG. 1 and FIG. 2, there are shown a structural plan view and a circuit block view of an active audio and video signal transmission device of the disclosure. As shown in FIG. 1 and FIG. 2, the active audio and video signal transmission device 1 comprises a cable 10, a display-side connector 11, and a signal source connector 12.

As shown in FIG. 2, the active audio and video signal transmission device 1 is an audio and video signal transmission device applied to a high-definition multimedia interface (HDMI). The cable 10 comprises a first end 100 and a second end 101. The active audio and video signal transmission device 1 comprises a display-side connector 11 connected to the first end 100 of the cable 10, and a signal source connector 12 connected to the second end 101 of the cable 10. The display-side connector 11 may be called as a sink end, and the signal source connector 12 may be called as a source end.

As shown in FIG. 2, the display-side connector 11 comprises a first shell 110, a first circuit board 111, a first plug 112, a repeater 113, and a microprocessor 114. The first circuit board 111 is configured within the first shell 110. The first plug 112 is configured on the first circuit board 111, and protruded from the first shell 110. The repeater 113 is configured on the first circuit board 111, and electrically connected to the first plug 112 and the first end 100 of the cable 10. The microprocessor 114 is configured on the first circuit board 111, electrically connected to the repeater 113, and used for controlling an operation of the repeater 113. Specifically, in the disclosure, the repeater 113 is only configured within the display-side connector 11, and is not configured within the signal source connector 12.

In one embodiment, the display-side connector 11 further comprises a power management chip 115. The power management chip 115 is electrically connected to the first end 100 of the cable 10 for obtaining a power supply from the cable 10, and used for converting the power supply to a working voltage, and transmitting the working voltage to the repeater 113 and the microprocessor 114.

Selectively, the power management chip 115 may be also configured on the first circuit board 111.

The signal source connector 12 is connected to a HDMI signal output device, for example, set-top box, or computer. The display-side connector 11 is connected to a HDMI signal input device, for example, television or projection equipment.

As shown in FIG. 2, the signal source connector 12 further comprises a second shell 120, a second circuit board 121, and a second plug 122. The second circuit board 121 is configured within the second shell 120. The second end 101 of the cable 10 is electrically connected to the second plug 122 via the second circuit board 121.

An audio and video signal outputted from the HDMI signal output device (such as set-top box, or computer) is transmitted to the HDMI signal input device (such as television or projection equipment) via the second plug 122, the cable 10, the repeater 113 used for enhancing the audio and video signal, and the first plug 112 in sequence.

The repeater 113 includes three electrical characteristics, such as Equalization, Flat Gain, and Output Swing. The active audio and video signal transmission device 1 can achieve to maintain the signal integrity and optimize the signal attenuation slope by adjusting the parameters of three electrical characteristics of the repeater 113.

The display-side connector 11 and the signal source connector 12 are connectors conforming to HDMI 2.1 standard specification. Further, the first plug 112 of the display-side connector 112 and/or the second plug 122 of the signal source connector 12 are connectors in the form of TYPE A, TYPE B, TYPE C, TYPE D, or TYPE E conforming to HDMI 2.1 standard specification.

Figure 3:
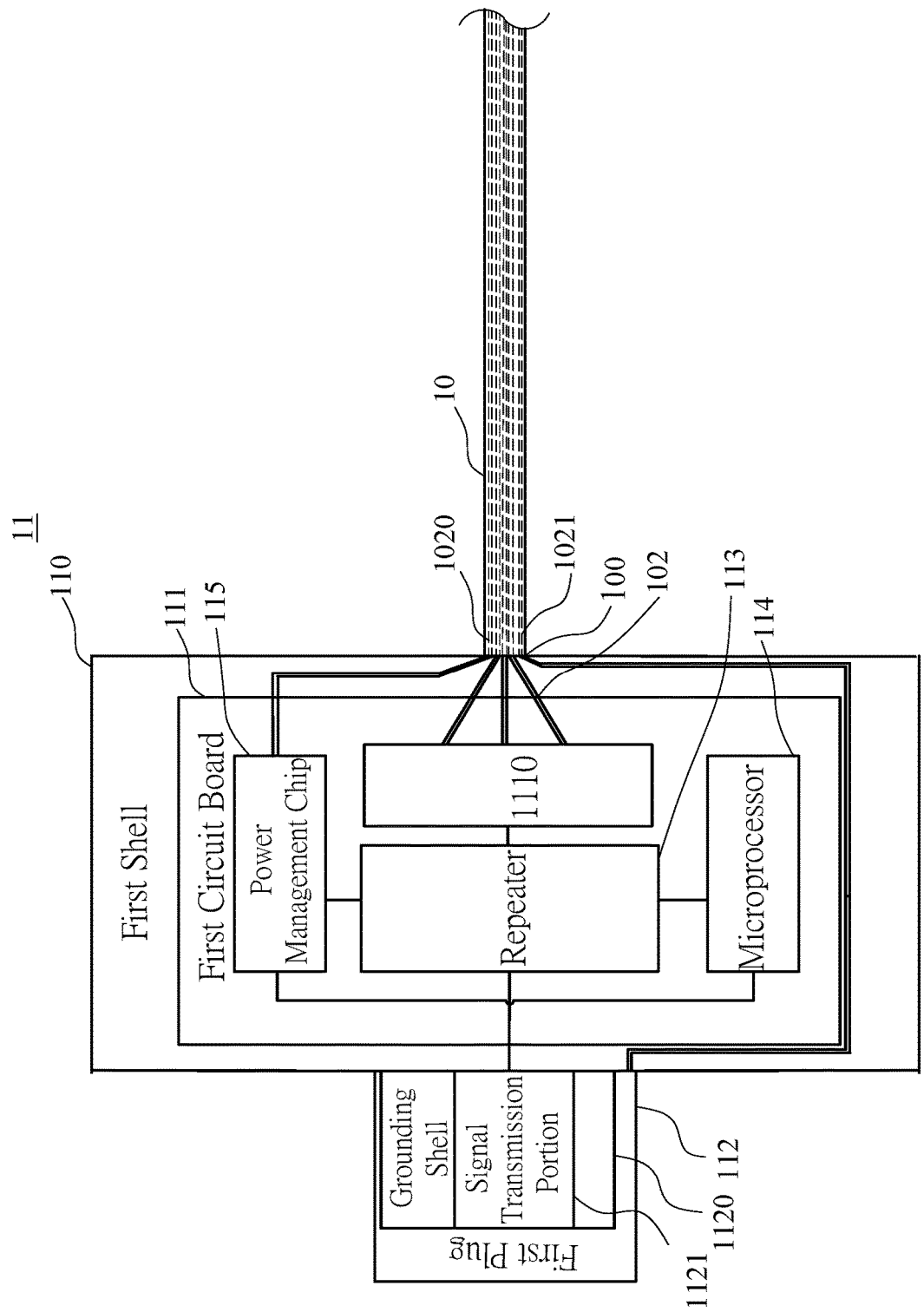
FIG. 3 is a detail circuit block view of a display-side connector of the active audio and video signal transmission device of the disclosure.

As shown in FIG. 2 and FIG. 3, the cable 10 comprises a plurality of signal transmission wires 102. The signal transmission wires 102 at the first end 100 is electrically connected to the repeater 113 via the first core wire welding area 1110 of the first circuit board 111 of the display-side connector 11. The signal transmission wires 102 at the second end 101 is electrically connected to the second plug 122 via the second core wire welding area 1210 of the second circuit board 121 of the signal source connector 12.

Figure 4:
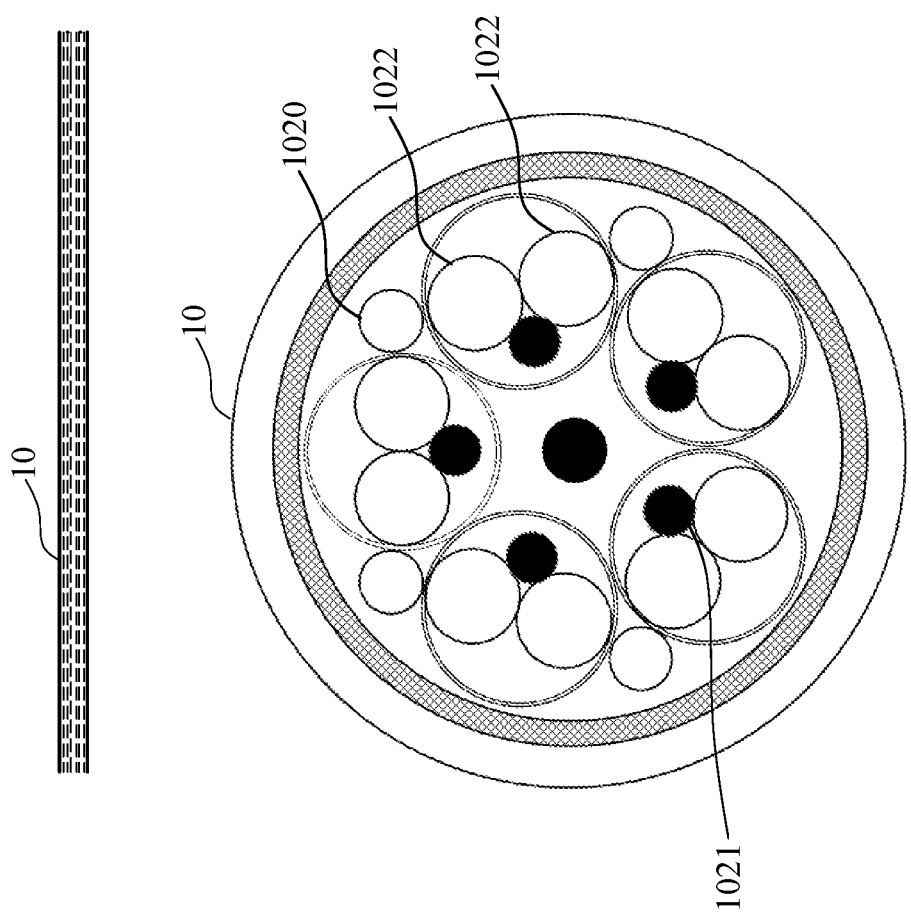
FIG. 4 is a sectional view of a cable of the active audio and video signal transmission device of the disclosure.

In more detail, as shown in FIG. 3 and FIG. 4, the inside of the cable 10 comprises at least one power wire 1020. The power wire 1020 is electrically connected to the power management chip 115, and used to transmit the power supply, for example, Vcc of 5V, to the power management chip 115.

Furthermore, the power management chip 115 is connected to the repeater 113 and the microprocessor 114 so as to provide a working voltage required by the repeater 113 and the microprocessor 114. For example, the power management chip 115 converts 5V voltage provided from the power wire 1020 to the working voltage required by the repeater 113 and the microprocessor 114.

As shown in FIG. 3 and FIG. 4, the first plug 112 of the display-side connector 11 has a grounding shell 1120 and a signal transmission portion 1121. The cable 10 further comprises at least one grounding wire 1021 and at least one high-speed signal transmission core wire 1022. The grounding wire 1021 at the first end 100 is electrically connected to the grounding shell 1120, and the grounding shell 1120 surrounds the signal transmission portion 1121. The signal transmission portion 1121 is electrically connected to the signal transmitting wires 102 via the repeater 113.

The signal transmission portion 1121 is a tongue plate. The grounding wire 1021 at first end 100 of the cable 10 is electrically connected to the grounding shell 1120, which surrounds the signal transmission portion 1121, and is used for shielding the signal transmission portion 1121. Terminals configured on the signal transmission portion 1121 is connected the repeater 113, and further electrically connected to the high-speed signal transmission core wire 1022 via the repeater 113.

In a specific embodiment of the disclosure, the range of cross-sectional area of the high-speed signal transmission core wire 1022 in the cable 10 is from 0.02 square millimeters corresponding to No. 40 of American Wire Gauge to 0.3 square millimeters corresponding to No. 12 of American Wire Gauge, and the length range of the cable 10 is from 3 meters to 15 meters. Further, the cross-sectional area of the high-speed signal transmission core wire 1022 in the cable 10 is 0.05 square millimeters corresponding to No. 30 of American Wire Gauge, and the length of the cable 10 is 7.5 meters. Or, the cross-sectional area of the high-speed signal transmission core wire 1022 in the cable 10 is 0.08 square millimeters corresponding to No. 28 of American Wire Gauge, and the length of the cable 10 is 9.0 meters. Otherwise, the cross-sectional area of the high-speed signal transmission core wire 1022 in the cable 10 is 0.128 square millimeters corresponding to No. 26 of American Wire Gauge, and the length of the cable 10 is 12.0 meters. It is worth noting that American Wire Gauge of a wire refers to its thickness. Each of American Wire Gauge gauges is represented by a number, with smaller numbers representing thicker wire gauges and higher numbers signifying thinner wires. Therefore, when the wire diameter of the high-speed signal transmission core wire 1022 becomes thicker, the length of the cable 10 can be effectively increased.

Figure 5:
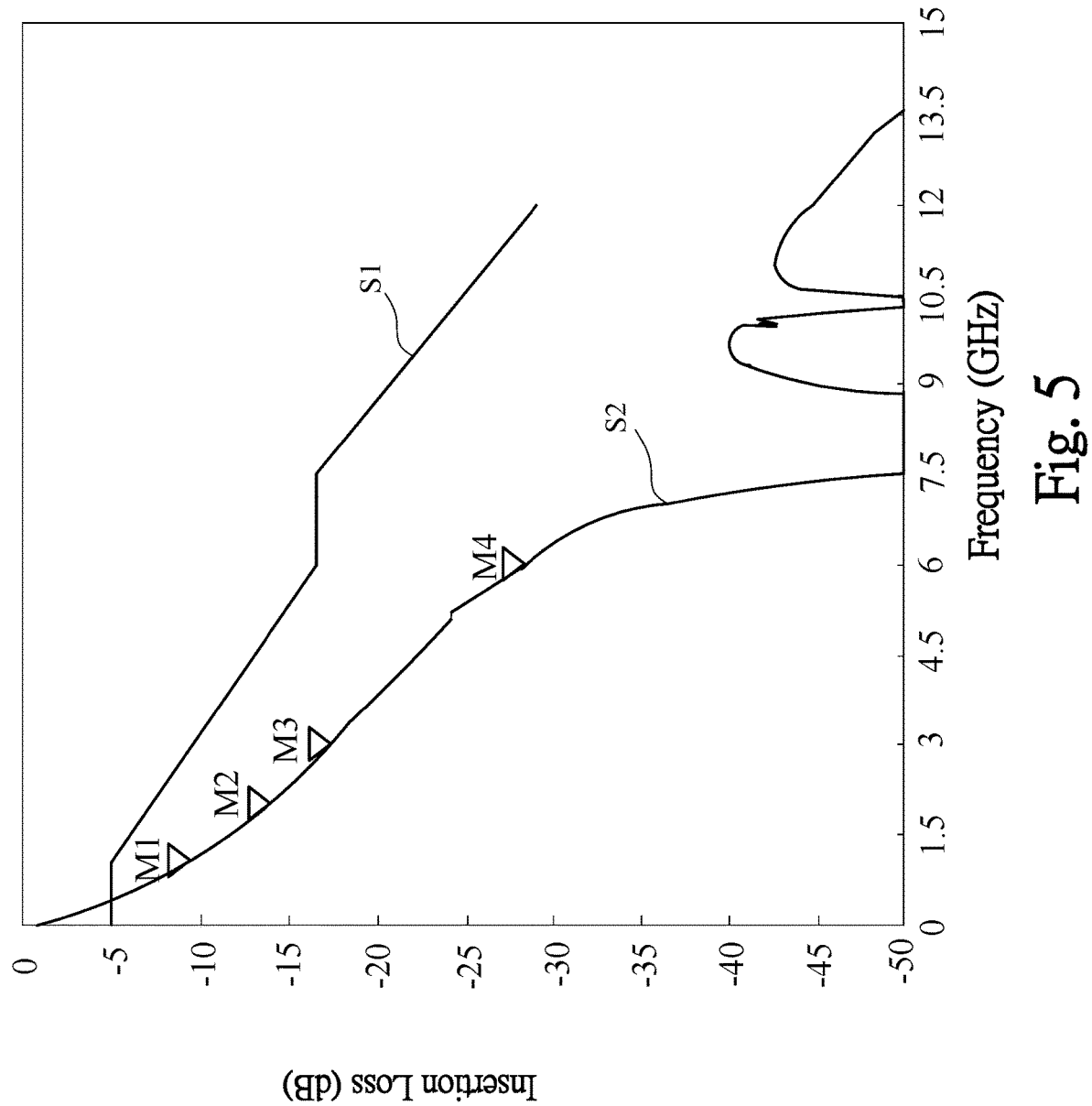
FIG. 5 is an insertion loss measurement diagram of a passive video and audio signal transmission device of HDMI 2.1 specification of the prior art.

FIG. 5 is an insertion loss measurement diagram of a passive video and audio signal transmission device of HDMI 2.1 specification of the prior art. In an example, the passive video and audio signal transmission device of HDMI 2.1 specification of the prior art may adopt a cable that is having a length of 12 meters, and including high-speed signal transmission core wires with the cross-sectional area of 0.128 square millimeters corresponding to No. 26 of American Wire Gauge. In FIG. 5, the curve S1 is a curve conforming to HDMI 2.1 standard specification, and the curve S2 is a curve for measuring the insertion loss to the cable of the passive video and audio signal transmission device of HDMI 2.1 specification of the prior art. As shown in the curve S2 of FIG. 5, through the measurement of the insertion loss to the cable of the passive video and audio signal transmission device of HDMI 2.1 specification of the prior art, it obtains that the insertion loss is −9.2 dB at M1 measurement point of the frequency (1 GHz), the insertion loss is −13.506 dB at M2 measurement point of the frequency (2 GHz), the insertion loss is −17.097 dB at M3 measurement point of the frequency (3 GHz), and the insertion loss is −28.180 dB at M4 measurement point of the frequency (4 GHz).

As known from the curves S1 and S2 of FIG. 5, the insertion loss of all measurement points on the curve S2 exceed the standard specified by the curve S1. Apparently, when the cable of the passive video signal transmission device of HDMI 2.1 specification of the prior art is used for signal transmission at any frequency, its insertion loss all fails to meet the requirements of the standard specification.

Figure 6:
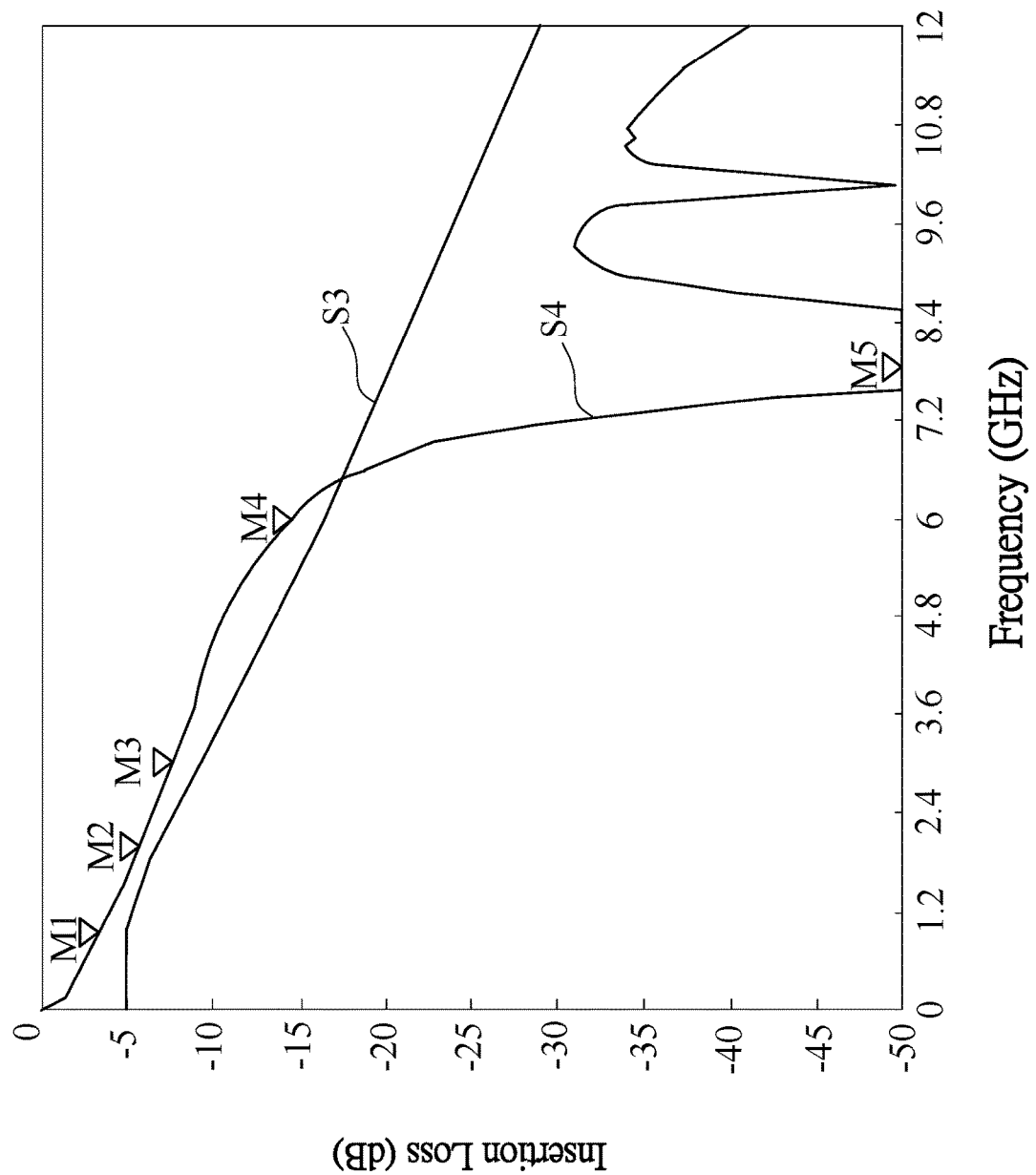
FIG. 6 is an insertion loss diagram of the active video and audio signal transmission device of HDMI 2.1 specification of the disclosure.

FIG. 6 is an insertion loss diagram of the active video and audio signal transmission device of HDMI 2.1 specification of the disclosure. The active video and audio signal transmission device of HDMI 2.1 specification of the disclosure also adopts the cable that is having the length of 12 meters, and including high-speed signal transmission core wires with the cross-sectional area of 0.128 square millimeters corresponding to No. 26 of American Wire Gauge. In FIG. 6, the curve S3 is a curve conforming to HDMI 2.1 standard specification, and the curve S4 is a curve for measuring the insertion loss to the cable of the active video and audio signal transmission device of HDMI 2.1 specification of the disclosure. As shown in the curve S4 of FIG. 6, through the measurement of the insertion loss to the cable of the active video and audio signal transmission device of HDMI 2.1 specification of the disclosure, it obtains that the insertion loss is −3.491 dB at M1 measurement point of the frequency (1 GHz), the insertion loss is −5.948 dB at M2 measurement point of the frequency (2 GHz), the insertion loss is −7.851 dB at M3 measurement point of the frequency (3 GHz), the insertion loss is −14.492 dB at M4 measurement point of the frequency (6 GHz), and the insertion loss is −92.120 dB at M4 measurement point of the frequency (7.79 GHz).

As known from the curves S3 and S4 of FIG. 6, except for measurement point M5, the insertion loss of measurement points M1, M2, M3, and M4 of other frequencies falls within the standard range specified by curve S3. In other words, according to the measurement result of insertion loss, the insertion loss of the cable of the active video signal transmission device of the disclosure can conform the requirements of HDMI 2.1 standard specification when it is used for signal transmission below the frequencies of 6.5 GHz. Accordingly, the active video and audio signal transmission device of HDMI 2.1 specification of the disclosure with the repeater 113 is used for frequencies below 6.5 GHz, and the insertion loss of signal of the cable of which will meet the requirements of HDMI 2.1 standard specification.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. An active audio and video signal transmission device, comprising:
   a cable comprising a first end and a second end;
   a display-side connector, comprising:
      a first shell;
      a first circuit board configured within the first shell;
      a first plug configured on the first circuit board, and protruded from the first shell;
      a repeater, configured on the first circuit board, and electrically connected to the first plug and the first end of the cable, wherein the repeater includes electrical characteristics of equalization, flat gain, and output swing, and is configured to maintain signal integrity by adjusting parameters of the electrical characteristics; and
      a microprocessor, configured on the first circuit board, electrically connected to the repeater, and used for controlling an operation of the repeater without receiving any external instruction; and
   a signal source connector electrically connected to the second end of the cable.

2. The active audio and video signal transmission device according to claim 1, wherein the display-side connector and the signal source connector are connectors conforming to HDMI 2.1 standard specification.

3. The active audio and video signal transmission device according to claim 1, wherein the display-side connector further comprises a power management chip, the power management chip is configured on the first circuit board, connected to the first end of the cable for obtaining a power supply from the cable, and used for converting the power supply to a working voltage, and transmitting the working voltage to the microprocessor.

4. The active audio and video signal transmission device according to claim 3, wherein the cable comprises a plurality of signal transmitting wires that are electrically connected to the repeater via a first core wire welding area of the first circuit board of the display-side connector.

5. The active audio and video signal transmission device according to claim 4, wherein the cable comprises a power wire that is electrically connected to the power management chip via the first core wire welding area.

6. The active audio and video signal transmission device according to claim 5, wherein the first plug of the display-side connector comprises a grounding shell and a signal transmission portion, and the cable further comprises a grounding wire; the grounding wire at the first end is electrically connected to the grounding shell, and the grounding shell surrounds the signal transmission portion; the signal transmission portion is electrically connected to the plurality of signal transmitting wires via the repeater.

7. The active audio and video signal transmission device according to claim 1, wherein the signal source connector further comprises a second shell, a second circuit board, and a second plug, the second circuit board is configured within the second shell, the second end of the cable is connected to the second plug via the second circuit board.

8. The active audio and video signal transmission device according to claim 1, wherein the cable comprises at least one high-speed transmission core wire, a range of cross-sectional area of each of the at least one high-speed transmission core wire is from 0.02 square millimeters to 0.3 square millimeters.

9. The active audio and video signal transmission device according to claim 8, wherein a length range of the cable is from 3 meters to 15 meters.

10. A cable connector assembly, comprising:
a cable comprising a first end and a second end;
a connector, comprising:
  a shell;
  a circuit board configured within the shell;
  a plug configured on the circuit board, and protruded from the shell;
  a repeater, configured on the circuit board, and electrically connected to the plug and the end of the cable, wherein the repeater includes electrical characteristics of equalization, flat gain, and output swing, and is configured to maintain signal integrity by adjusting parameters of the electrical characteristics; and
  a microprocessor, configured on the circuit board, electrically connected to the repeater, and used for controlling an operation of the repeater without receiving any external instruction.

11. The cable connector assembly according to claim 10, wherein the connector further comprises a power management chip, the power management chip is configured on the circuit board, connected to the end of the cable for obtaining a power supply from the cable, and used for converting the power supply to a working voltage, and transmitting the working voltage to the microprocessor.

12. The cable connector assembly according to claim 11, wherein the cable comprises a plurality of signal transmitting wires that are electrically connected to the repeater via a core wire welding area of the circuit board of the connector.

13. The cable connector assembly according to claim 12, wherein the cable comprises a power wire that is electrically connected to the power management chip.

14. The cable connector assembly according to claim 13, wherein the plug of the connector comprises a grounding shell and a signal transmission portion, and the cable further comprises a grounding wire; the grounding wire is electrically connected to the grounding shell, and the grounding shell surrounds the signal transmission portion; the signal transmission portion is electrically connected to the plurality of signal transmitting wires via the repeater.

15. The cable connector assembly according to claim 10, wherein the cable comprises at least one high-speed transmission core wire, a range of cross-sectional area of each of the at least one high-speed transmission core wire is from 0.02 square millimeters to 0.3 square millimeters.

16. The cable connector assembly according to claim 15, wherein a length range of the cable is from 3 meters to 15 meters.

17. An active audio and video signal transmission device, comprising:
a cable comprising a first end and a second end;
a sink end connector, comprising:
  a first shell;
  a first circuit board configured within the first shell;
  a first plug configured on the first circuit board, and protruded from the first shell;
  a repeater, configured on the first circuit board, and electrically connected to the first plug and the first end of the cable, wherein the repeater includes electrical characteristics of equalization, flat gain, and output swing, and is configured to maintain signal integrity by adjusting parameters of the electrical characteristics; and
  a microprocessor, configured on the first circuit board, electrically connected to the repeater, and used for controlling an operation of the repeater without receiving any external instruction; and
a source end connector electrically connected to the second end of the cable.

18. The active audio and video signal transmission device according to claim 17, wherein the sink end connector is a display-side connector, and the source end connector is a signal source connector.

19. The active audio and video signal transmission device according to claim 17, wherein the cable comprises at least one high-speed transmission core wire, a range of cross-sectional area of each of the at least one high-speed transmission core wire is from 0.02 square millimeters to 0.3 square millimeters.

20. The active audio and video signal transmission device according to claim 17, wherein a length range of the cable is from 3 meters to 15 meters.

\* \* \* \* \*